UNITED STATES PATENT OFFICE.

ALEXIS ALEXANDER SHUKOFF, OF ST. PETERSBURG, RUSSIA.

PROCESS OF MAKING TERPENE ESTERS.

No. 900,316.

Specification of Letters Patent.

Patented Oct. 6, 1908.

Application filed May 4, 1907. Serial No. 371,913.

*To all whom it may concern:*

Be it known that I, ALEXIS ALEXANDER SHUKOFF, doctor of philosophy, of St. Petersburg, Russia, a subject of the Emperor of Russia, and whose post-office address is No. 86 Borowaja, St. Petersburg, Russian Empire, have invented a new and useful Process of Manufacturing Esters of Terpene Alcohols; and I do hereby declare that the following is a full, clear, and exact description of my invention, which will enable others skilled in the art to which it appertains to make and use the same.

The present invention has for its object an improved process of manufacturing esters of terpene alcohols from terpenes.

A well-known process for manufacturing esters of isoborneol from camphenes consists in heating a mixture of camphene, glacial acetic acid and sulfuric acid. To obtain a satisfactory result with this process, it is absolutely necessary that the mixture of the said three substances constitutes a perfectly homogeneous solution. Now this homogeneity can only be obtained by applying a large excess of glacial acetic acid over the theoretical proportion thereof. The ground for this is that, though glacial acetic acid is a very efficient solvent for camphene, a large portion of the latter, if only the theoretical proportion of said solvent is used, will be caused to separate out upon sulfuric acid being added, the glacial acetic acid being thinned by this addition and its dissolving power reduced accordingly. Now I have discovered that in practicing said process for manufacturing esters of isoborneol the large proportion of glacial acetic acid hitherto required can be considerably reduced without causing any separation of camphene or provoking other bad effects, by the addition of an unsaturated acid of the higher fatty series, for instance linoleic acid, linolenic acid, oleic acid, elaidic acid and isooleic acid.

The beneficial result obtained by the present invention may readily be grasped from the following statement. In theory, in order to dissolve 100 parts of camphene only 43.5 parts of glacial acetic acid are required; in practice, however, from 200 to 300 parts of it must be applied. Now by adding for instance 50 parts of linoleic acid the said quantity of from 200 to 300 parts of glacial acetic acid may be reduced to 50 parts, that is to say a proportion not far from the theoretical one. Moreover, the linoleic acid used may easily be reobtained from the saponified mass resulting from the reaction, and re-used, whereas the acetic acid will be lost entirely or recovered in the state of a very thin acid. A similar beneficial result is obtained by proceeding with other terpene alcohols in order to produce other esters in starting from terpenes, for instance esters of borneol or esters of terpenyl from pinene, or esters of terpineol from dipentene or limonin.

The effect brought about by the presence of an unsaturated acid of the higher fatty series may be attributed to the property of the said acids of readily transforming into sulfo-acids when brought together with sulfuric acid, and to the property of such sulfo-acids of being very efficient solvents for hydrocarbons.

In practicing the present invention, a mixture of acetic ester and the ester of the unsaturated acid of the higher fatty series used is obtained; this is, however, of no practical consequence, because those esters have no practical use other than for manufacturing the respective terpene alcohol and both esters are transformed into the respective alcohol by the same process, *i. e.* by saponifying by means of an alcoholic potash solution, decomposing the product obtained by sulfuric acid and driving off the alcohol formed by means of a current of steam. Moreover, I have discovered that other mineral acids may be substituted for sulfuric acid; for instance hydrochloric acid and nitric acid have proved to be good substitutes.

*Examples.*

1. 100 parts of camphene are mixed with 50 parts of glacial acetic acid, 50 parts of raw linoleic acid (obtained for instance by saponifying linseed oil by means of steam) and 10 parts of sulfuric acid having 50 per cent.; this mixture is heated to 80° centigrade for about two hours and then diluted with water. The reactions taking place may be represented by the following equations:

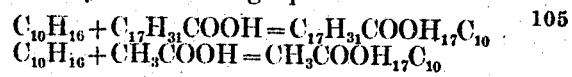

The raw mixture of acetate and linoleate of borneol may be used as such or purified in well-known manner by shaking it with an aqueous solution of sodium carbonate, and driving off the remainder of unaltered camphene by distillation.

2. 100 parts of rectified turpentine oil are mixed with 200 parts of glacial acetic acid, 200 parts of linoleic acid and 50 parts of sulfuric acid having 50 degrees Baumé, the mixture is heated for about 2 hours to a temperature of from 40 to 50° centigrade when the further treatment is carried out as outlined in the 1st example.

3. 100 parts of camphene are mixed with 50 parts of glacial acetic acid, 50 parts of linoleic acid and 10 parts of ordinary hydrochloric acid, the mixture is heated for about two hours up to 70° centigrade, when the further treatment is carried out as outlined in the 1st example.

Having fully described my invention, what I desire to claim, and secure by Letters Patent of the United States, is:—

1. The described process of manufacturing esters of terpene alcohols which consists in preparing a solution of the terpene to be treated in a mixture of glacial acetic acid in less than theoretical quantity and an unsaturated acid of the higher fatty series, adding a mineral acid, and heating the mixture, substantially as described.

2. The described process of manufacturing esters of terpene alcohols which consists in preparing a solution of the terpene to be treated in a mixture of glacial acetic acid in less than theoretical quantity and linoleic acid, adding a mineral acid, and heating the mixture substantially as described.

3. The described process of manufacturing esters of terpene alcohols which consists in preparing a solution of the terpene to be treated in a mixture of glacial acetic acid in less than theoretical quantity and an unsaturated acid of the higher fatty series, adding chlorhydric acid and heating the mixture substantially as described.

4. The described process of manufacturing esters of terpene alcohols which consists in preparing a solution of the terpene to be treated in a mixture of glacial acetic acid in less than theoretical quantity and linoleic acid, adding hydrochloric acid and heating the mixture substantially as described.

In testimony whereof I have hereunto set my hand in presence of two subscribing witnesses.

ALEXIS ALEXANDER SHUKOFF.

Witnesses:
H. A. LOVIAGUINE,
EDW. WARSCHEIDT.